US012330220B2

(12) United States Patent
Zhao et al.

(10) Patent No.: US 12,330,220 B2
(45) Date of Patent: Jun. 17, 2025

(54) CUTTING TOOL

(71) Applicant: ZCC CUTTING TOOLS EUROPE GMBH, Düsseldorf (DE)

(72) Inventors: Quanliang Zhao, Düsseldorf (DE); Jose Agustin-Paya, Mülheim an der Ruhr (DE); Robert Militello, Dortmund (DE)

(73) Assignee: ZCC CUTTING TOOLS EUROPE GMBH, Düsseldorf (DE)

( * ) Notice: Subject to any disclaimer, the term of this patent is extended or adjusted under 35 U.S.C. 154(b) by 922 days.

(21) Appl. No.: 17/414,779

(22) PCT Filed: Oct. 30, 2019

(86) PCT No.: PCT/DE2019/100935
§ 371 (c)(1),
(2) Date: Jun. 16, 2021

(87) PCT Pub. No.: WO2020/125845
PCT Pub. Date: Jun. 25, 2020

(65) Prior Publication Data
US 2022/0072623 A1 Mar. 10, 2022

(30) Foreign Application Priority Data
Dec. 20, 2018 (DE) .................... 10 2018 133 164.9

(51) Int. Cl.
*B23B 27/16* (2006.01)
*B23B 27/14* (2006.01)
*B23B 27/22* (2006.01)

(52) U.S. Cl.
CPC ...... *B23B 27/143* (2013.01); *B23B 2200/081* (2013.01); *B23B 2200/087* (2013.01)

(58) Field of Classification Search
CPC ............ B23B 27/143; B23B 2200/081; B23B 2200/087; B23B 27/145; B23B 2200/32; B23B 2200/0447
See application file for complete search history.

(56) References Cited

U.S. PATENT DOCUMENTS 5,192,171 A * 3/1993 Ther ...................... B23B 27/143
D15/139
5,265,985 A * 11/1993 Boppana ............... B23B 27/143
D15/139

(Continued)

FOREIGN PATENT DOCUMENTS

| AT | 501655 A1 | 10/2006 |
| DE | 3105377 A1 | 10/1982 |

(Continued)

*Primary Examiner* — Sara Addisu
(74) *Attorney, Agent, or Firm* — McGlew and Tuttle, P.C.

(57) ABSTRACT

The invention relates to a cutting tool for machining, in particular for a peeling-like machining process, comprising a chip-forming depression which runs along the cutting edge and in which elevated chip-forming elements are formed. According to the invention, the elevated chip-forming elements have an elongated contour with a length which is greater than the width, in plan view, such that the chip-forming elements have a rising flank and a falling flank. The rising flank, which is longer by comparison, is defined by a rising angle (α) of 3° to 20°, preferably 5° to 10°, and a falling angle (β) of 25° to 45°, preferably 27° to 35°, and the transition between the rising flank and the falling flank is rounded, the radius (R) of said rounded section ranging between 0.05 mm and 1 mm, preferably between 0.25 mm and 0.4 mm.

14 Claims, 4 Drawing Sheets

(56) References Cited

U.S. PATENT DOCUMENTS

Figure 1:
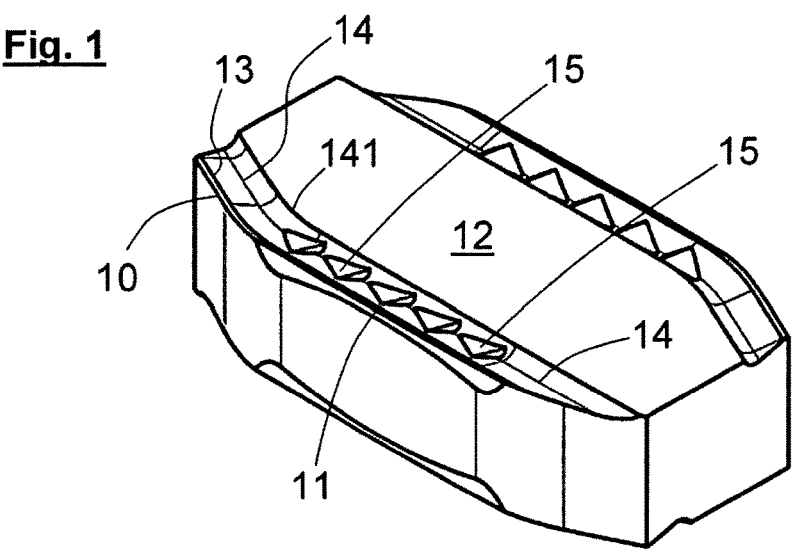

| | | | |
|---|---|---|---|
| 5,437,522 A | 8/1995 | Satran et al. | |
| 5,743,681 A * | 4/1998 | Wiman | B23B 27/143 407/116 |
| 5,758,994 A * | 6/1998 | Hintze | B23B 27/141 407/115 |
| 5,791,833 A * | 8/1998 | Niebauer | B23B 27/141 407/116 |
| 5,921,722 A * | 7/1999 | Paya | B23B 27/143 407/115 |
| 6,267,541 B1 * | 7/2001 | Isakov | B23B 27/143 407/115 |
| 2004/0037659 A1 * | 2/2004 | Sung | B23C 5/202 407/116 |
| 2007/0034063 A1 * | 2/2007 | Wurfels | B23B 27/1618 83/74 |
| 2011/0293383 A1 * | 12/2011 | Kaufmann | B23B 27/143 407/114 |
| 2012/0087751 A1 * | 4/2012 | Yamaguchi | B23B 27/143 407/115 |
| 2015/0023744 A1 * | 1/2015 | Wu | B23B 27/143 407/116 |
| 2015/0165528 A1 * | 6/2015 | Gremer | B23B 27/1614 407/66 |
| 2015/0174664 A1 * | 6/2015 | Nam | B23C 5/06 407/116 |
| 2017/0100778 A1 * | 4/2017 | Lof | B23B 27/1644 |
| 2019/0009345 A1 * | 1/2019 | An | B23B 27/22 |
| 2021/0237166 A1 * | 8/2021 | Kawakami | B23B 27/141 |
| 2024/0227027 A1 * | 7/2024 | Göberl | B23B 27/045 |

FOREIGN PATENT DOCUMENTS

| | | | | |
|---|---|---|---|---|
| DE | 4136417 A1 | 5/1993 | | |
| DE | 4415491 A1 | 11/1995 | | |
| DE | 4437093 A1 | 4/1996 | | |
| DE | 19725341 B4 | 6/2009 | | |
| DE | 102010021730 A1 * | 12/2011 | | B23B 27/143 |
| DE | 102013113235 A1 * | 6/2014 | | B23B 27/143 |
| DE | 102013011031 A1 * | 1/2015 | | B23B 27/141 |
| DE | 102015105050 A1 * | 10/2015 | | B23B 27/143 |
| EP | 0143758 A1 | 6/1985 | | |
| EP | 0117400 B1 | 1/1988 | | |
| EP | 0278083 A1 | 8/1988 | | |
| EP | 0611334 B1 | 10/1995 | | |
| EP | 0674559 B1 | 7/1997 | | |
| JP | 2002301606 A | 10/2002 | | |
| JP | 2003039225 A | 2/2003 | | |
| JP | 2003039255 A | 2/2003 | | |
| WO | 0103869 A1 | 1/2001 | | |

* cited by examiner

CUTTING TOOL

The invention relates to a cutting tool for machining, in particular for peeling-type machining, having a chip-forming depression which runs along the cutting edge and in which raised chip-forming elements are arranged.

Machining is to be understood as the chip-removing processing of metals such as e.g. steel and cast iron, but also non-ferrous metals and even plastics.

The present invention is suitable in principle for cutting tools for turning, milling or grooving, and in particular for peeling.

Chip-guiding or chip-forming elements in cutting inserts have the task of forming and directing the chips removed from the workpiece, wherein it should be ensured in particular that the workpiece is not damaged by the chips that have formed, as can occur for example in the case of so-called snarl chips. The chips should also be guided and broken in such a way that the friction caused by chip travel is limited sufficiently to avoid excess heating of the cutting insert, and in particular the cutting edge, since this would lead to more rapid tool wear. In the case of certain workpieces, such as for example aluminum or plastic, there is also the risk of the chips sticking to the rake surface if a large amount of heat is developed.

The particular case of a cutting tool for peeling-type machining is described in DE 197 25 341 B4. The cutting tool has adjacently arranged primary and secondary edges, which together form an obtuse angle. Along these edges, a chip groove with a rising flank facing the cutting edge is provided, which has at least two protrusions delimited laterally by adjacent recesses in plan view. As is generally the case for peeling tools, the secondary edge is substantially longer than the primary edge. In bar peeling, the aim is to achieve surface roughnesses of the workpiece of 4 μm to 8 μm.

A further indexable cutting insert suitable for peeling-type machining is described in EP 0 117 400 B1. This indexable cutting insert is nonagonal and has three primary and secondary edges of different lengths on its upper and lower sides, giving the shape of an equilateral triangle with symmetrically distorted vertices. The ratio of the length of the primary edges to the length of the secondary edges should be between 1:1.5 and 1:3. Along each primary edge, a chip-forming groove is provided, which extends approximately parallel to the primary edge. In regions remote from the cutting edge, the chip-forming groove merges into a rising flank, which is flush with an upper flank.

In EP 0611 334 B1 a polygonal cutting insert with a rake surface is described, which has a central breaker that protrudes relative to the plane defined by the cutting edges, extending outwardly towards a cutting corner region in the form of at least one longitudinal rib, preferably two longitudinal ribs arranged symmetrically to a cutting corner angle bisector and whose longitudinal axes have a common intersection in the region of the chip breaker.

In addition, according to the prior art, chip grooves on rake surfaces are known which extend substantially parallel to the secondary edge. It is true that these chip grooves lift the outgoing chip away from the workpiece but there is inadequate chip guidance, and so the outgoing chip is uncontrollable. In DE 197 25 341, therefore, chip grooves with two laterally limited protrusions are proposed. In EP 0 278 083 A1 a cutting insert is proposed in which, on the rake surface at a right angle to the cutting edge, a region with a rake angle of more than 30° adjoins the chamfer, the rake angle decreasing with increasing distance from the chamfer. In the rake surface regions of the cutting body between the cutting corner regions, chip ribs extending in the direction of chip travel and arranged with a lateral spacing one beside the other are arranged such that they protrude from the rake surface, further elevations with run-up ramps being located between said chip ribs. In the corner region, three burr-like raised portions are arranged one beside the other, with the outer two raised portions having their longitudinal burr axes parallel to the adjacent chip ribs.

EP 0 143 758 A1 relates to a cutting insert with elongated ribs, which are trapezoidal in cross-section and run parallel to the cutting edge. These ribs are interrupted by depressions.

To deal with different advance speeds and cut depths and to reduce the frictional force of the outgoing chip as far as possible, EP 0 674 559 B1 proposes a cutting insert with at least one chip-guiding groove with raised chip-forming elements in the form of longitudinal ribs that at least partly bridge over the chip-guiding groove and that are provided with additional chip-guiding elements transverse to the longitudinal rib axis.

It is an object of the present invention to develop a cutting tool of the above-mentioned type, in which the friction of the outgoing chip is minimized, the cutting forces are kept low and the chip guiding is improved with the lowest possible cutting resistance.

This object is achieved by a cutting tool according to claim 1. According to the invention, the raised chip-forming elements provided in the chip-forming depression (chip-forming groove)—in plan view—have an elongated contour with a length greater than the width. Furthermore, the chip-forming elements have a rising flank and a falling flank, wherein the comparatively longer rising flank is defined by a rising angle of 3° to 20°, preferably 5° to 10° and the falling flank by an angle of between 25° and 45°, preferably 27° to 35°, wherein the transition from the rising flank to the falling flank is rounded and the radius of this rounded portion is between 0.05 mm and 1 mm, preferably 0.25 mm to 0.4 mm.

Developments of this cutting insert are described in the subclaims. As a result of this measure, on the one hand safe chip guiding is ensured in the region of the rising flanks in conjunction with the maximum elevation of the raised chip-forming element, and on the other hand high friction of the outgoing chip is avoided, because the chip is only in partial contact with the rake surfaces in the falling flanks. This effect is intensified in particular if, in plan view, the raised chip-forming elements have a greater width in the region of their boundary line, which is defined by the contiguous rising and falling flanks, than in the adjacent regions.

Preferably, the chip-forming elements are arranged spaced apart from one another, in particular at a distance of 0.4 mm to 0.6 mm, each with a length of 4 mm to 10 mm as defined by their longitudinal axes. Further preferably, the chip-forming elements are lined up on a line extending parallel to the cutting edge, wherein the orientation of the chip-forming elements is inclined by 10° to 20°, preferably 15°, to the direction of chip travel. The rising angle $\alpha$ and the angle $\beta$ of the falling flank are formed by the connecting line between the foot of the rising or falling flank, as applicable, in the region of the groove and the upper vertex on the crest line, and the connecting line between the two feet of the rising and falling flanks running parallel to the cutting edge in the groove.

In a particular embodiment of the invention, the chip-forming elements are oriented towards the active cutting edge such that the incoming cut chip is guided in the direction of the longitudinal axis of the chip-forming elements.

The chip-forming elements can have a concave, convex or partially rectilinear shape in a cross-sectional view perpendicular to their longitudinal axis, the concave configuration being preferred.

As an alternative to chip-forming elements arranged separately one beside the other within a chip-forming groove, it is possible for the chip-forming elements to be lined up in the manner of fish scales, each of the chip-forming elements overlapping by 10% to 30%, viewed in their longitudinal direction. This fish-scale structure has advantages in turning or milling tools in particular.

Apart from the overlap in the longitudinal direction, it is also possible to use chip-forming elements that additionally overlap laterally, in which case the degree of overlap measured vertically to the longitudinal axis should be no more than 20%, preferably no more than 10%.

According to a further embodiment of the invention—in particular in the region of a cutting corner—the chip-forming elements are arranged and configured with axial symmetry relative to the cutting corner angle bisector.

Finally, at a distance from the cutting edge and behind the chip-forming depression viewed in the direction of chip travel, a flank rising to a central raised plateau can be located, from which in addition, preferably half-rib-like further chip-forming elements extend towards the cutting edge, and protrude into the space between the raised chip-forming elements described above.

To stabilize the cutting edge, a chamfer can be provided.

Those embodiments in which individual raised chip-forming elements protrude into the cutting edge and break through it, forming a local cutting edge elevation, also lie within the scope of the present invention. As a result of this measure, the cutting edge obtains a non-linear configuration with adjacently located slight elevations.

Exemplary embodiments of the invention are illustrated in the drawings. The figures show the following:

FIG. 1 a perspective view of a peeling tool

Figure 2:
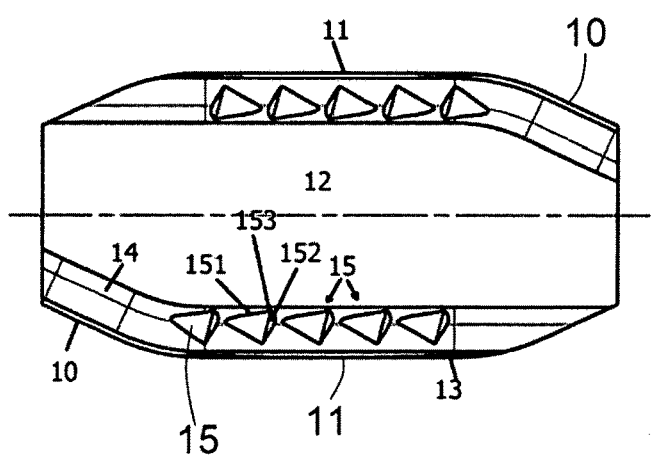

FIG. 2 a plan view of the peeling tool according to FIG. 1

Figure 3:
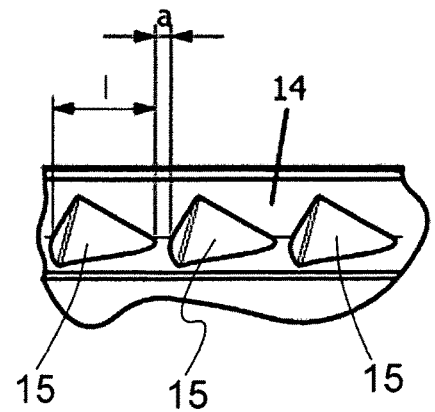
Figure 4:
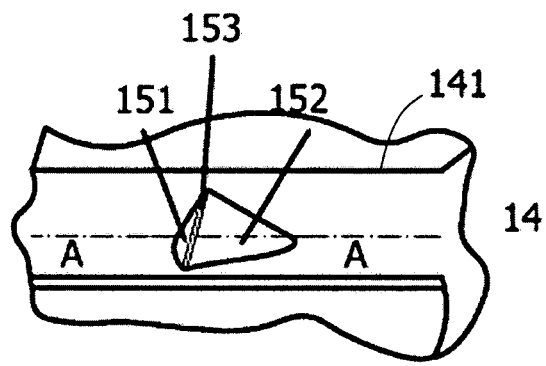
Figure 5:
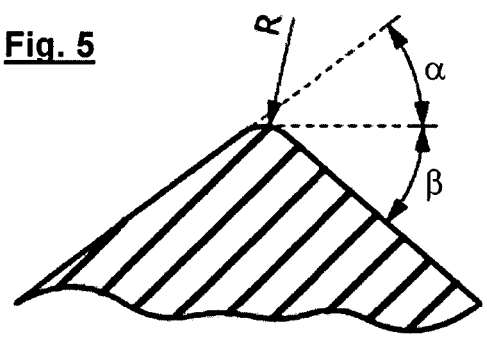

FIG. 3 a detail view of a chip-forming groove with raised chip-forming elements FIG. 4 a single view of a chip-forming element in a chip-forming groove FIG. 5 a section according to line A-A in FIG. 4

Figure 6:
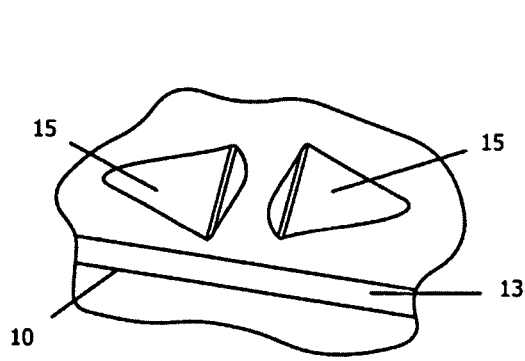
Figure 7:
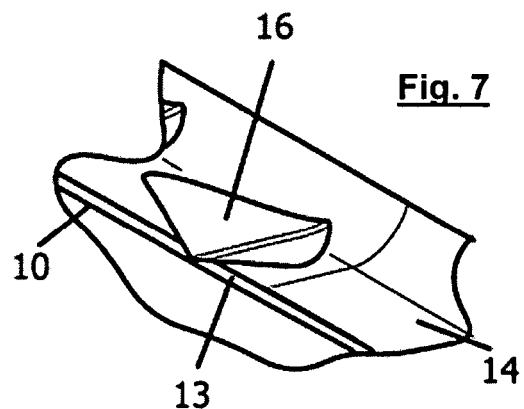
Figure 8:
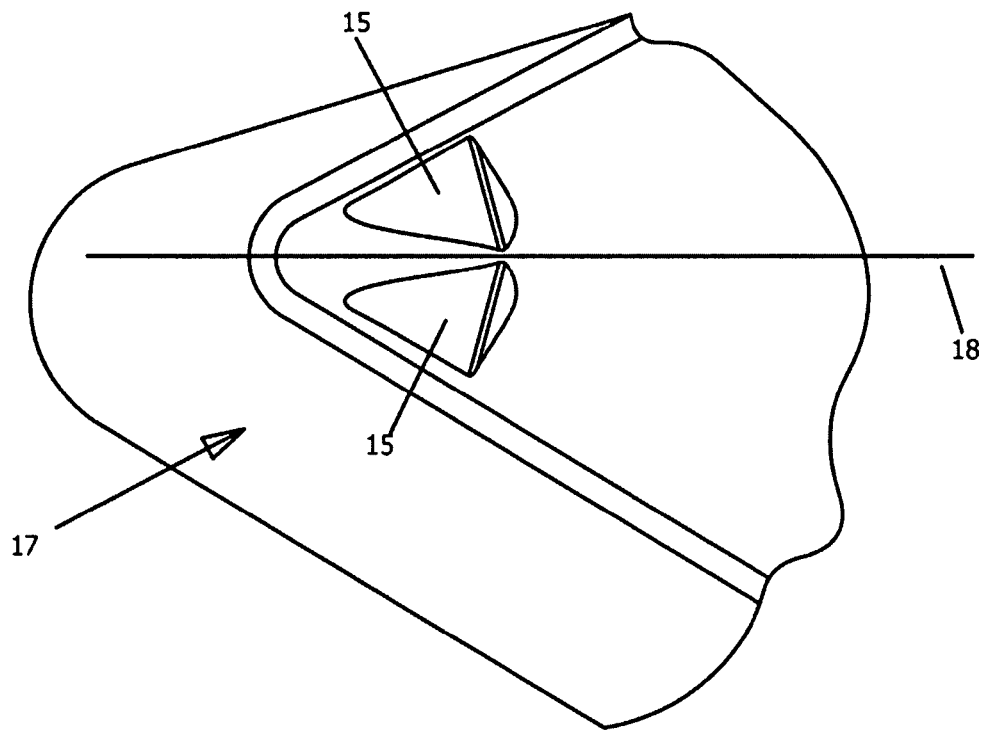
Figure 9:
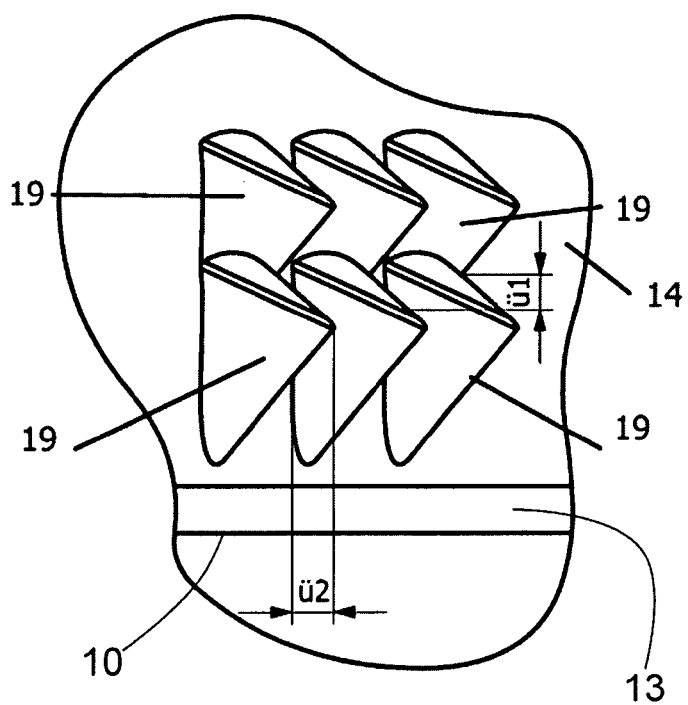
Figure 10:
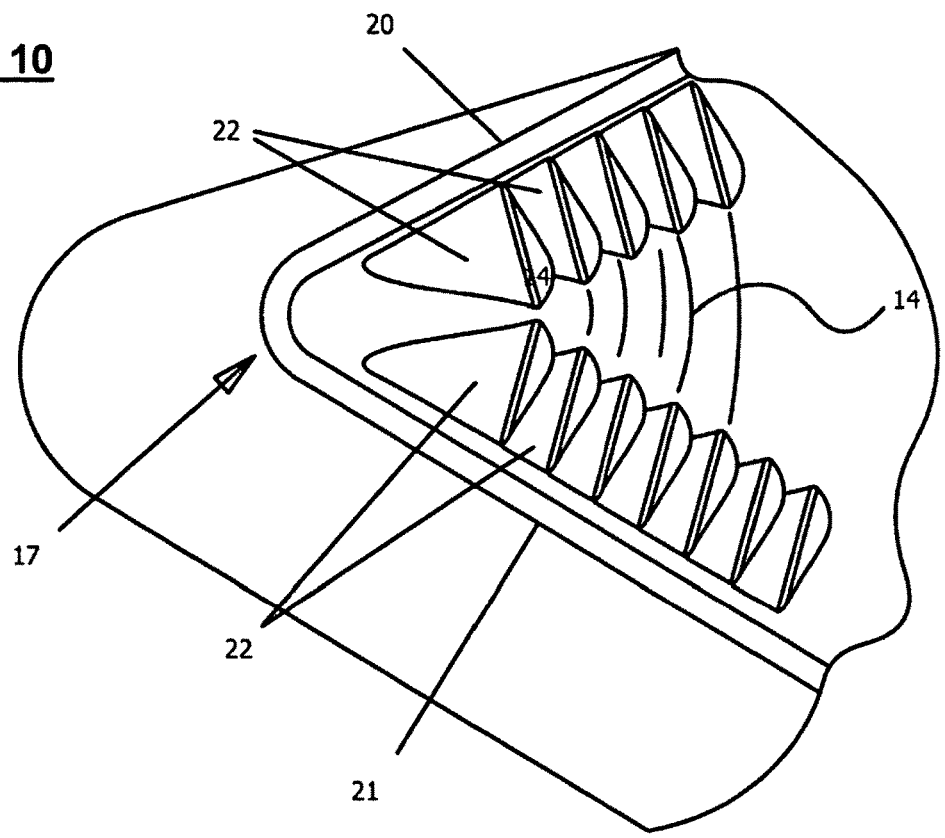
Figure 11:
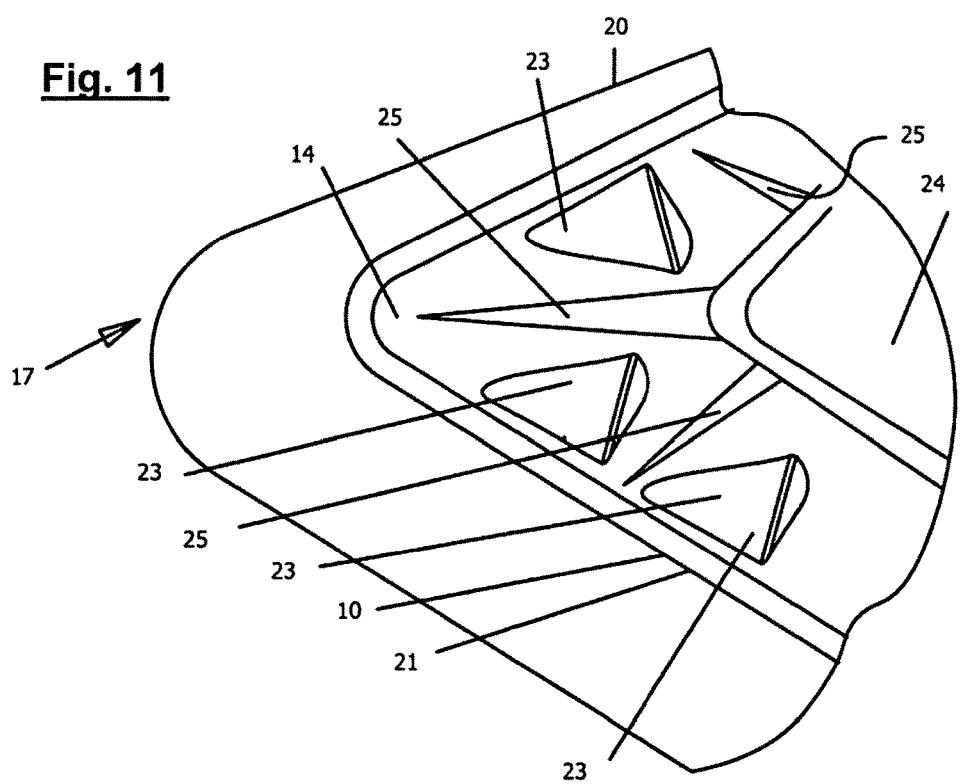

FIG. 6 a chip-forming groove with raised chip-forming elements arranged offset to one another FIG. 7 a further embodiment of a chip-forming groove with a chip-forming element which breaks through the cutting edge FIG. 8 a corner region of a cutting tool for turning, with two edges converging towards each other at an acute angle, FIG. 9 a detail view of a chip-forming groove with raised chip-forming elements in a fish-scale-like arrangement FIG. 10 a detail view of a rhombic cutting insert with raised chip-forming elements lined up in the manner of fish scales and FIG. 11 a detail view of a cutting corner of a rhombic cutting insert with differently raised chip-forming elements and a flank rising to a central plateau.

The present invention can be used in principle in all basic shapes of cutting insert known according to the prior art, such as for example triangular, square, rhombic or approximately rectangular cutting plates, as used in particular for peeling, in which a short primary edge is adjoined by a relatively long secondary edge, forming an obtuse angle of less than 180°.

The invention can also be used in principle in recessing inserts, which are not illustrated in the present case.

In so far as so-called indexable cutting plates are used, these can have a positive or negative contour. With a positive contour, the upper and lower sides are formed as rake surfaces with appropriately bordering cutting edges In FIGS. 1 and 2, a cutting tool (as a replaceable cutting insert) for peeling is illustrated. These cutting inserts are characterized by a relatively short primary edge 10 in conjunction with a long secondary edge 11, the primary and secondary edges forming an obtuse angle. The central rake surface plateau 12 is formed in a raised manner as supporting and rake surfaces in so-called indexable cutting inserts. In the case of the cutting inserts according to FIGS. 1 and 2, therefore, four usable primary edges and four usable secondary edges are present.

As is known in principle, the cutting edge or a chamfer 13 can be directly adjoined by a chip-forming depression 14 or chip-forming groove. Within this chip-forming groove 14, individual raised chip-forming elements 15 (here five raised chip-forming elements 15 lined up adjacent to one another) are provided, each having a relatively flat rising flank with a rising angle of preferably 5° to 10° measured relative to an imaginary horizontal plane. This rising angle $\alpha$, which is exaggerated in FIG. 5 for clarity, is in any case smaller than the angle $\beta$ of the falling flank, which can be for example 30°. Both in the longitudinal sectional view A-A and in a view transverse to this sectional plane, the chip-forming element 15 is preferably convex. The rising angle $\alpha$ and the angle $\beta$ of the falling flank are formed by the connecting line between the foot of the rising or falling flank, as applicable, in the region of the groove 14 and the upper vertex on the crest line 153, and the connecting line between the two feet of the rising and falling flanks extending parallel to the cutting edge in the groove 14. On the upper crest line 153, which is defined by the transition between the rising flank 151 and the falling flank 152, the chip-forming element has a radius R of between 0.25 mm and 0.4 mm. The chip-forming groove 14 is formed by a falling part, viewed from the cutting edge 10 or the chamfer 13, and therefore a rake angle of for example 10° to 15° can be obtained. This falling part, which can be rectilinear or can be curved in a concave manner, is adjoined at a cutting depression minimum by a part that rises up to an edge 141, which delimits a central rake surface plateau 12.

The rising angle to this rake surface plateau can be as great as or greater than the angle of the falling flank. This chip-forming groove, which is known in principle according to the prior art, serves to bend the chip and to break it off as short as possible.

In FIG. 3, a part of a chip-forming depression 14 with three adjacently arranged raised chip-forming elements 15 is illustrated. The distance between the chip-forming elements is for example 0.5 mm; the length l of each of the individual chip-forming elements is approx. 5 mm. The chip-forming elements, as shown in FIGS. 2 and 3, can each have an identical contour and can be lined up along a common line or alternatively, as indicated in FIG. 6, can be arranged offset to one another, i.e. at different distances from the cutting edge. Furthermore, the raised chip-forming elements 15 can also be arranged with a 180° rotation, such that two falling flanks are opposite each other as in the illustration in FIG. 6.

In a further embodiment, illustrated in FIG. 7, the extremely concave chip-forming element 16 there is arranged such that it breaks through the chamfer 13 or the cutting edge 10, resulting in a local cutting edge elevation.

In FIG. 8, the acute-angled cutting corner 17 of a rhombic cutting insert is illustrated, in which the rake surface configuration is axially symmetrical relative to the cutting edge bisector 18. In the chip-forming depression adjoining the cutting edge or chamfer, two raised chip-forming elements 15 are arranged, in which the shorter and steeper falling flanks are opposite each other.

Another type of embodiment of the rake surface of the cutting tool with overlapping raised chip-forming elements can be taken from FIG. 9. The chip-forming elements 19 there have a relatively significantly longer rising flank and, in contrast, a very short falling flank, which falls on to the rising flank of the raised chip-forming element behind it. This results in a zigzag contour viewed in the direction of chip travel.

In addition, the chip-forming elements 19 located parallel to the cutting edge but at equal distances from the cutting edge overlap, resulting in an approximately wave-shaped profile parallel to the cutting edge 10, which has the effect that the travelling chip experiences good guidance on the one hand, but on the other hand friction that is as low as possible as it is guided over the chip-forming elements 19. The overlap regions, labelled with the reference signs $Ü_1$ and $Ü_2$, are 10% to 30% ($Ü_1$) and no more than 20% ($Ü_2$).

In the exemplary embodiment illustrated in FIG. 10, a rhombic cutting insert having a cutting corner 17 is likewise selected, in which the cutting edges 20, 21 converge. In the falling chip depression 14, raised chip-forming elements 22 are arranged one behind the other parallel to the cutting edge 20, 21 in each case in an overlapping manner.

The combination of the raised chip-forming elements according to the invention in conjunction with already known chip-forming elements is shown by FIG. 11. In the example there, individual raised chip-forming elements 23 each of the same type, which can correspond approximately to the chip-forming elements illustrated in FIGS. 1 to 5, are arranged in a chip-forming depression 14. In the exemplary embodiment selected there, the longitudinal axis of these chip-forming elements 23 is oriented approximately perpendicular to the cutting edge; an angle of no more than 10° to 15° to the cutting edge vertical should be selected.

The chip breaker 24 that can be seen from FIG. 11 falls into the chip-forming depression 14 for example at an angle of approximately 20°, the chip breaker 24 protruding significantly above the cutting edge 10. From this chip breaker raised portion, there protrude longitudinal ribs 25, whose orientation and contour was described in principle in DE 41 36417 A1. These ribs 25 each extend into regions between the raised chip-forming elements 23 according to the present invention.

REFERENCE SIGNS LIST

10 Primary edge
11 Secondary edge
12 Central rake surface plateau
13 Chamfer
14 Chip-forming depression
141 Upper edge of the chip-forming depression
15 Chip-forming elements
151 Rising flank
152 Falling flank
153 Upper crest line
16 Chip-forming element
17 Cutting corner
18 Cutting edge bisector
19 Chip-forming element
20, 21 Cutting edges
22 Chip-forming elements
23 Chip-forming elements
24 Chip breaker
25 Half-rib-like chip-forming elements
a Distance
Length of chip-forming element
R Radius
$Ü_1$, $Ü_2$ Overlap regions
α Rising angle
β Angle of falling flank

The invention claimed is:

1. A cutting tool for machining, the cutting tool comprising:
a cutting edge with a chip-forming depression which runs along the cutting edge; and
raised chip-forming elements arranged in the chip-forming depression, wherein the raised chip-forming elements have an elongated contour with a length which is greater than a width, in plan view, the chip-forming elements have a rising flank and a falling flank, wherein the rising flank, which is longer by comparison, is defined by a rising angle of 3° to 20°, and a falling angle of between 25° and 45°, the transition from the rising flank to the falling flank is rounded as a rounded portion and a radius of the rounded portion is between 0.05 mm and 1 mm.

2. The cutting insert according to claim 1, wherein in plan view, the raised chip-forming elements have a greatest width in a region of an upper crest line thereof, which is defined by contiguous rising and falling flanks.

3. The cutting insert according to claim 1, wherein the chip-forming elements are spaced apart from one another.

4. The cutting insert according to claim 1, wherein the chip-forming elements are lined up on a line extending parallel to the cutting edge, wherein an orientation of the chip-forming elements is inclined by 10° to 20° to a direction of chip travel.

5. The cutting insert according to claim 1, further comprising another cutting edge wherein one of the cutting edge and the other cutting edge is an active cutting edge and the chip-forming elements are oriented to the active cutting edge such that an incoming cut chip is guided in a direction of a longitudinal axis of the chip-forming elements.

6. The cutting insert according to claim 1, wherein the chip-forming elements have a concave, convex or partly rectilinear shape in a cross-sectional view, perpendicular to a longitudinal axis.

7. The cutting insert according to claim 1, wherein at least individual raised chip-forming elements protrude into the cutting edge and break through the cutting edge, forming a local cutting edge elevation.

8. The cutting insert according to claim 1, wherein the chip-forming elements each merge into one another and are juxtaposed in a fish scales pattern.

9. The cutting insert according to claim 1, wherein the chip-forming elements overlap laterally, wherein a degree of overlap measured vertically to a longitudinal axis is no more than 20%.

10. The cutting insert according to claim 1, wherein in a region of a cutting corner an arrangement and a configuration of the chip-forming elements is axially symmetrical to a cutting corner angle bisector.

11. The cutting insert according to claim 1, wherein at a distance from the cutting edge and behind the chip-forming depression, as viewed in the direction of chip travel, a flank rising to a central raised plateau is provided.

12. The cutting insert according to claim 1, wherein a chamfer adjoins the cutting edge.

13. A cutting tool for machining, the cutting tool comprising:
- a cutting edge with a chip-forming depression which runs along the cutting edge; and
- raised chip-forming elements arranged in the chip-forming depression, wherein the raised chip-forming elements have an elongated contour with a length which is greater than a width, in plan view, the chip-forming elements have a rising flank and a falling flank, wherein the rising flank, which is longer by comparison, is defined by a rising angle of 3° to 20°, and a falling angle of between 25° and 45°, the transition from the rising flank to the falling flank is rounded as a rounded portion and a radius of the rounded portion is between 0.05 mm and 1 mm, wherein at a distance from the cutting edge and behind the chip-forming depression, as viewed in the direction of chip travel, a flank rising to a central raised plateau is provided.

14. A cutting tool for machining, the cutting tool comprising:
- a cutting edge with a chip-forming depression extending along the cutting edge; and
- raised chip-forming elements arranged in the chip-forming depression, wherein the raised chip-forming elements have an elongated contour with a length and a width, the length being greater than the width, wherein, in plan view, the chip-forming elements have a rising flank and a falling flank, wherein the rising flank is defined by a rising angle of 3° to 20°, and a falling angle of between 25° and 45°, the transition from the rising flank to the falling flank is rounded as a rounded portion and a radius of the rounded portion is between 0.05 mm and 1 mm, the rising flank having a length that is greater than a length of the falling flank, wherein the chip-forming elements are aligned on a line extending parallel to the cutting edge, wherein an orientation of the chip-forming elements is inclined by 10° to 20° to a direction of chip travel.

* * * * *